5 Sheets—Sheet 1.

C. C. SKINNER.
Grading and Ditching Machine.

No. 208,497. Patented Oct. 1, 1878.

WITNESSES
A. Ruppert
J. G. Mason

INVENTOR
C. C. Skinner
D. P. Holloway & Co.
ATTORNEYS

C. C. SKINNER.
Grading and Ditching Machine.
No. 208,497. Patented Oct. 1, 1878.

5 Sheets—Sheet 5.

C. C. SKINNER.
Grading and Ditching Machine.

No. 208,497. Patented Oct. 1, 1878.

WITNESSES
A. Ruppert,
J. G. Mason

INVENTOR
C. C. Skinner
D. P. Holloway & Co
ATTORNEY

UNITED STATES PATENT OFFICE.

CHARLES C. SKINNER, OF EAU CLAIRE, WISCONSIN, ASSIGNOR TO GEORGE W. WILLIAMS, JR., AND HOBERT M. STOCKING, OF SAME PLACE.

IMPROVEMENT IN GRADING AND DITCHING MACHINES.

Specification forming part of Letters Patent No. 208,497, dated October 1, 1878; application filed December 29, 1877.

*To all whom it may concern:*

Be it known that I, CHARLES C. SKINNER, of Eau Claire, in the county of Eau Claire and State of Wisconsin, have invented certain new and useful Improvements in Grading and Ditching Machines; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in grading and ditching machines, the nature of which will be fully explained by reference to the accompanying drawings, in which—

Figure 1:
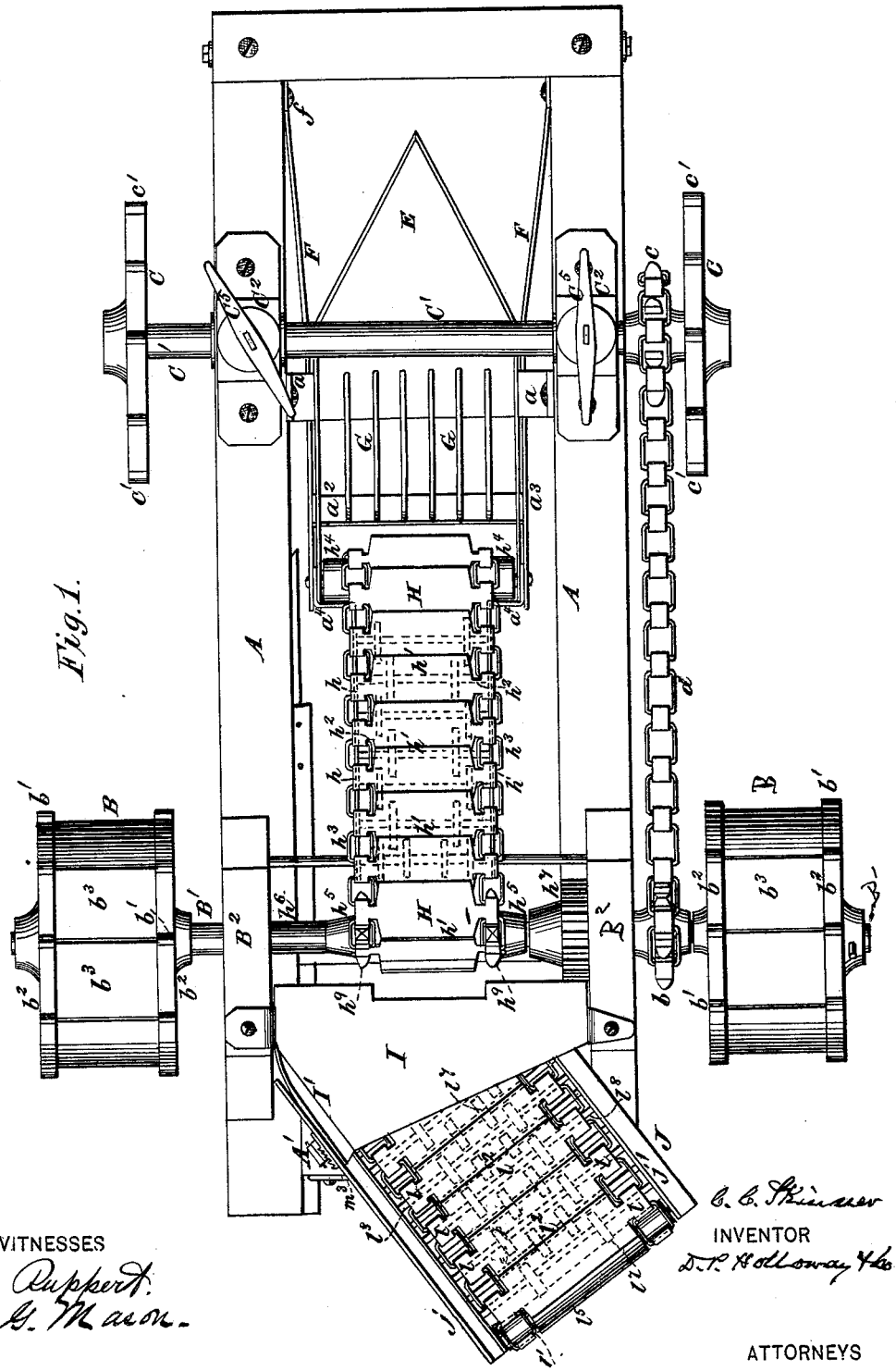
Figure 2:
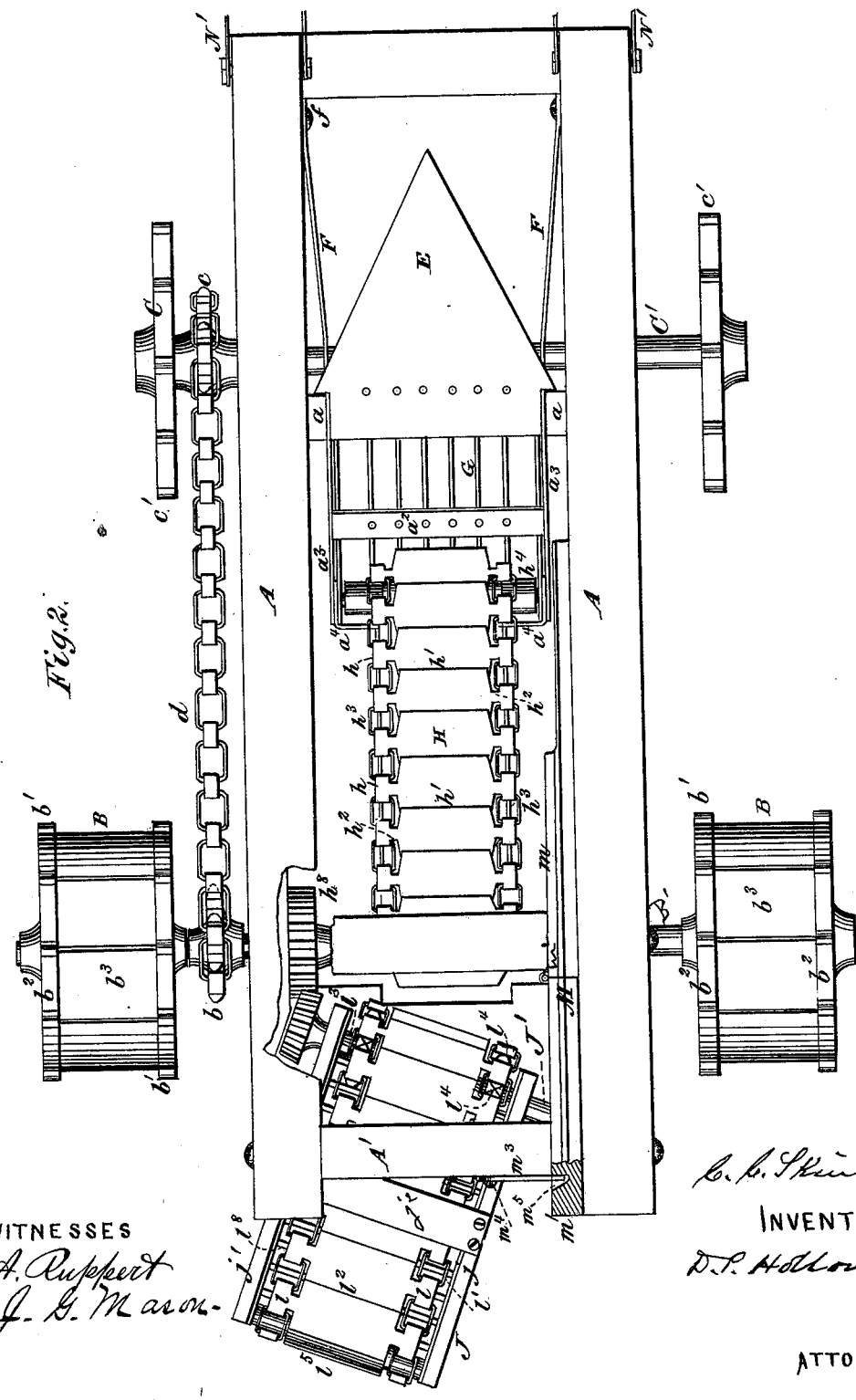
Figure 3:
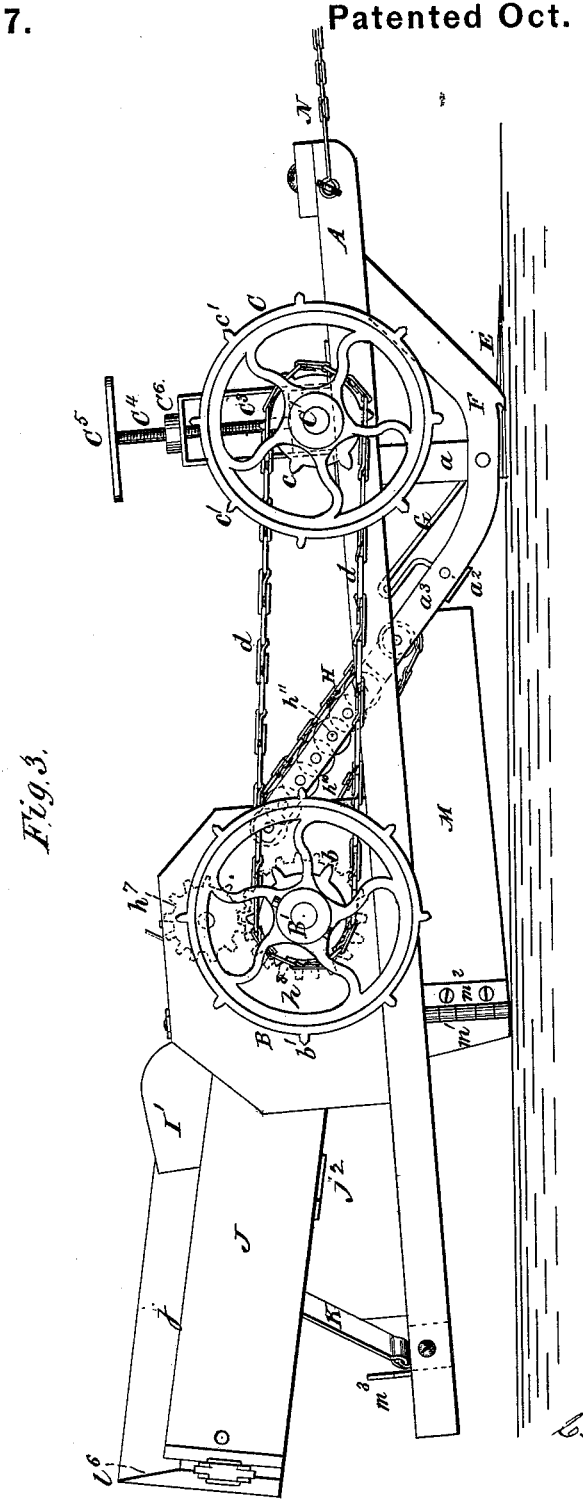
Figure 4:
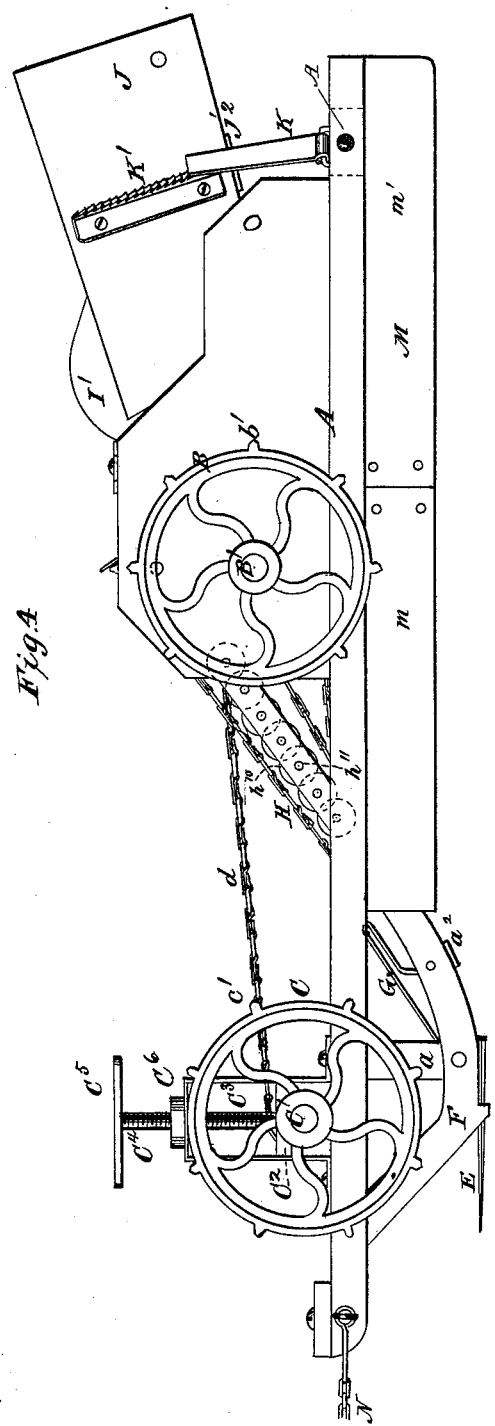
Figure 5:
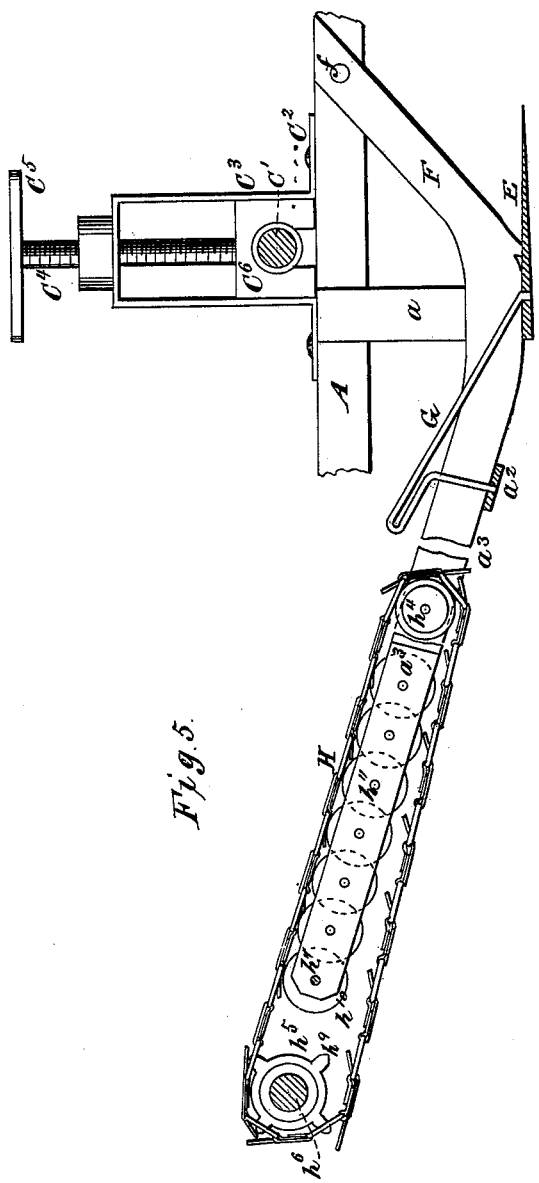
Figure 6:
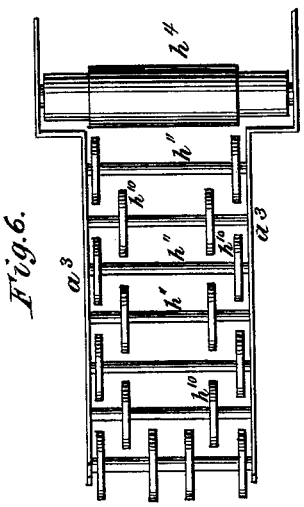

Figure 1 represents a plan; Fig. 2, an under-side view; Figs. 3 and 4, opposite-side views; Fig. 5, a section; and Fig. 6 shows a detail view.

In each of the views similar letters of reference are employed to indicate corresponding parts wherever they occur.

A represents the main framing, which is supported by means of two pairs of driving-wheels, B C, which are mounted on shafts $B^1$ $C^1$, working in bearings $B^2$ $C^2$, the bearing $B^2$ being carried by the main framing, while the bearings $C^2$ are supported with capability of sliding freely in guides $C^3$ carried by the forward end of the framing A.

The bearings $C^2$, with the shaft $C^1$, may be raised and lowered, as desired, by means of the screw-shafts $C^4$, which are provided with handles $C^5$, and work freely in bearings $C^6$ in the upper end of the guides $C^3$, while their lower ends are attached, with capability of revolving, in the bearings $C^2$.

The shafts $B^1$ $C^1$ are geared together by means of toothed pulleys $b$ $c$, mounted thereon, which engage with an endless chain or linked band, $d$.

By the use of the regulating-screws the machine may be so raised that the hind wheels will be raised clear of the ground, when they will cease to be driving-wheels, as all the weight is carried on the front wheels, and when this is the case, by means of the connecting-band connecting the two axles, the carrier will continue to be operated.

$b^1$ $c^1$ are teeth formed on the periphery of the wheels B C, for the purpose of giving those wheels a greater hold on the ground.

The wheels B are each composed of two flanged sections, $b^2$ $b^2$, supported at a considerable distance apart, and keyed on the shaft $B^1$. These sections $b^2 b^2$ are connected together by means of strips of iron or wood $b^3$, attached to the sections in such manner as to form a cylindrical bearing-surface to prevent the wheel B from sinking in when working on marshy or soft land, and at the same time, by the use of the hollow cylindrical drum, formed by staves between the flanges, I avoid unduly increasing the weight of the wheel, as is the case where solid broad-tread wheels are used for analogous purposes.

The slice of earth to be removed is cut by means of the arrow-shaped knife E, which is supported on either side by standards $a$, between a pair of side knives, F, the upper ends of which, at $f$, are connected to the frame A, while their lower ends are attached to the standards $a$.

G are a series of fingers, arranged at an angle to the knife E, and attached at their forward ends to the rear of the knife E, while at their rear ends they are bent over and turned back in such manner as to be supported and carried by the cross-bar $a^2$, which connects the side supports $a^3$, the lower ends of which are carried by the standards $a$, while their upper ends are supported by the cross-bar $a^4$, extending from side to side of the framing A.

If desired, the parts F and $a^3$ may be made in one continuous piece.

There have been heretofore used plane surfaces, bridging the distance between the plow or cutter and the carrier. I have found, in the use of these machines, that in clay and sticky soil the earth adheres to the surface of the bridge and seriously affects the working of the machine. I have substituted parallel bars with intermediate spaces, which permit the fine particles to fall through, and, presenting but comparatively a small surface, there is little adhesion of the earth to the edges of the bars, thereby obviating entirely, or almost entirely, the aforesaid impediment to the proper action of the machine.

H is an endless elevator, which is composed of a series of plates or slats, $h$, the center portions, $h^1$, of which lap or extend over the edges of one another, while at their ends they are cut away at $h^2$, and so formed that they may be connected together on either side by means of links $h^3$, so as to form an endless chain. The endless-chain elevator H is supported at each end by means of rollers $h^4$ $h^5$, the roller $h^4$ being carried by and revolving in bearings in the side supports $a^3$, while the roller $h^5$ is mounted on a shaft, $h^6$, (see Fig. 5,) revolving in bearings carried by the framing A, and receives motion by means of a toothed gear, $h^7$, which is taken into and driven by means of a pinion, $h^8$, mounted on the shaft $B^1$. $h^9$ $h^9$ are a series of teeth mounted on the roller $h^5$, and engaging with the links $h^3$, in order to give positive motion to the elevator H. $h^{10}$ $h^{10}$ are a series of pulleys or rollers mounted on shafts $h^{11}$, carried by the side frames or supports $a^3$. The pulleys $h^{10}$ are mounted in pairs on the shafts $h^{11}$, and are so arranged that the peripheries of the pulleys in one row shall overlap those of the next adjacent row, in order to bring their bearing-surfaces as near as possible together and give a more even support to the endless chain of the elevator H, and thereby prevent sagging of the same. I is an inclined chute or guide for conducting the slice of earth, cut away by the knife E and raised by the elevator H, to the side carrier J. The chute I is supported on either side of the framing A, and is formed angularly, and with a raised guard, $I'$, formed at an angle to the direction of motion of the machine, so as to turn the slices of earth as raised onto the side carrier J.

The side carrier J is composed of side bars or frames $j$ $j^1$, which are connected together on the under side by a cross-bar, $j^2$, and at their forward ends are pivoted on a cross-shaft, $J'$, mounted in bearings carried by the framing A, and are supported at an angle across the frame A in the rear of the elevator H and chute I. The side carrier J, at its rear end, is supported at any desired angle vertically by means of a hinged brace, K, which, at its lower end, is pivoted to the cross-bar $A'$ of the frame A, while its upper end is so formed as to engage with the toothed rack $K'$, attached to the side of the frame $j$. (See Fig. 4.)

Between the frames $j$ $j^1$, I arrange an endless chain of plates, $l$ $l$, which are connected together at their ends by means of links $l^1$, while at their centers $l^2$ they are so formed as to form a continuous carrying-surface for conducting the slices of earth raised to the side of the machine.

The endless chain of plates $l$ $l$ is supported at its forward end by means of a roller, $l^3$, (see Fig. 2,) mounted on the shaft $J'$, and provided with teeth $l^4$, engaging with the links $l^1$, while its rear end is supported and carried by a roller, $l^5$, revolving on axes carried by the frames $j$ $j^1$. The frame $j$ is extended considerably upward above the upper surface of the plates $l$ $l$ and is tapered off, as shown at $l^6$, Fig. 6, and serves as a guide to prevent the earth falling off that side of the side carrier J. The upper surface, or that part of the endless chain of plates $l$ $l$, for the time carrying the load of earth, is supported between the rollers $l^3$ and $l^5$ by means of a series of pulleys, wheels, or rollers, $l^7$, mounted in pairs on shafts $l^8$, and so arranged that their peripheries shall overlap one another, to give an even and constant support to that portion of the chain of plates $l$ $l$ carrying the earth to the side of the apparatus.

M is a land-side or guide formed on the under side of the frame A. This land-side or guide M is formed in two parts, $m$ $m^1$, which are connected together by means of a hinge, $m^2$. The object of thus dividing the land-side or guide M is that the part $m^1$ may be allowed to swing freely for the purpose of making a curve in a ditch. The side piece $m^1$ is held in position by means of a brace, $m^3$, pivoted at $m^4$ to the cross-bar $A'$, and dropping into a notch, $m^5$, in the side piece $m^1$.

The brace $m^3$ is employed to hold the piece $m^1$ in line with the front section of the land-side when cutting a straight ditch; but as the land-side is quite long, (about twelve feet in a working machine,) in turning curves—as, for instance, in avoiding a tree or rock—the brace is detached, so that the rear end of the land-side may be released to swing upon its pivot, and thus diminish, practically, by one-half the length of the land-side.

The apparatus may be drawn along by means of horse-power, or by a capstan, steam-engine, or other suitable motive power, by attaching a rope or chain to the draft-chain N.

Having thus described my invention, what I claim, and desire to secure by Letters Patent, is—

1. The combination, with the arrow-shaped knife E and side knives F, of the fingers G, constructed and operating substantially as described.

2. The combination, with an elevator, H, composed of a series of plates, $h$, connected together by links $h^3$, of a series of overlapping supporting wheels or pulleys, $h^{10}$, substantially as and for the purposes described.

3. A grading or ditching machine supported on axes $B^1$ $C^1$, geared together by means of an endless chain, substantially as shown and described.

4. The combination, in a grading or ditching machine with cutters, of the land-side M, placed in rear of the side cutters F, and divided by a hinge, $m^2$, into two sections, the rear one being horizontally adjustable in relation to the forward section, substantially as set forth.

5. The combination, with a grading or ditching machine, of the wheels B, constructed with flanged sections $b^2$ $b^2$, connected together by strips $b^3$, substantially as shown and described.

6. The combination, with a grading or ditching machine, of a side carrier, J, pivoted at an angle to the machine, and provided with an endless chain of plates, $l$ $l$, supported at each end on revolving axes, and intermediately by an overlapping series of pulleys, wheels, or rollers, substantially as set forth.

In testimony that I claim the foregoing as my own I affix my signature in presence of two witnesses.

CHARLES C. SKINNER.

Witnesses:
　SAMUEL H. COLE,
　W. W. DOWNS.